(12) United States Patent
Bergqvist et al.

(10) Patent No.: US 8,654,239 B2
(45) Date of Patent: Feb. 18, 2014

(54) FOCUS RING-CONTROLLED FOCUSING SERVO

(75) Inventors: Rune Bergqvist, Vaxholm (SE); Katrin Strandemar, Rimbo (SE); Ove Gustafsson, Farsta (SE)

(73) Assignee: FLIR Systems AB, Danderyd (SE)

( * ) Notice: Subject to any disclaimer, the term of this patent is extended or adjusted under 35 U.S.C. 154(b) by 223 days.

(21) Appl. No.: 13/109,677

(22) Filed: May 17, 2011

(65) Prior Publication Data

US 2011/0304766 A1 Dec. 15, 2011

Related U.S. Application Data

(60) Provisional application No. 61/345,516, filed on May 17, 2010.

(51) Int. Cl.
*G02B 13/16* (2006.01)
*H04N 5/225* (2006.01)

(52) U.S. Cl.
USPC ........... 348/335; 348/340; 348/345; 348/348; 348/349

(58) Field of Classification Search
USPC .......... 348/335, 340, 345, 348, 349, 350, 352
See application file for complete search history.

(56) References Cited

U.S. PATENT DOCUMENTS

| | | | | |
|---|---|---|---|---|
| 2007/0098384 A1* | 5/2007 | Wakamizu et al. | ............ | 396/56 |
| 2009/0086336 A1* | 4/2009 | Horiguchi et al. | ............ | 359/698 |
| 2009/0273702 A1* | 11/2009 | Okawara | ............ | 348/345 |

* cited by examiner

*Primary Examiner* — Yogesh Aggarwal
(74) *Attorney, Agent, or Firm* — Haynes and Boone, LLP

(57) ABSTRACT

An infrared (IR) camera comprising:
  a camera housing having an image capturing device;
  an objective with an optical lens system for generating an IR image of an object;
  a focusing mechanism for focusing the optical lens system;
  a focus ring that is displaceably mounted on the objective and adapted to control an electromechanical focusing servo system actuating the focusing mechanism dependent on a displacement of the focus ring.

13 Claims, 9 Drawing Sheets

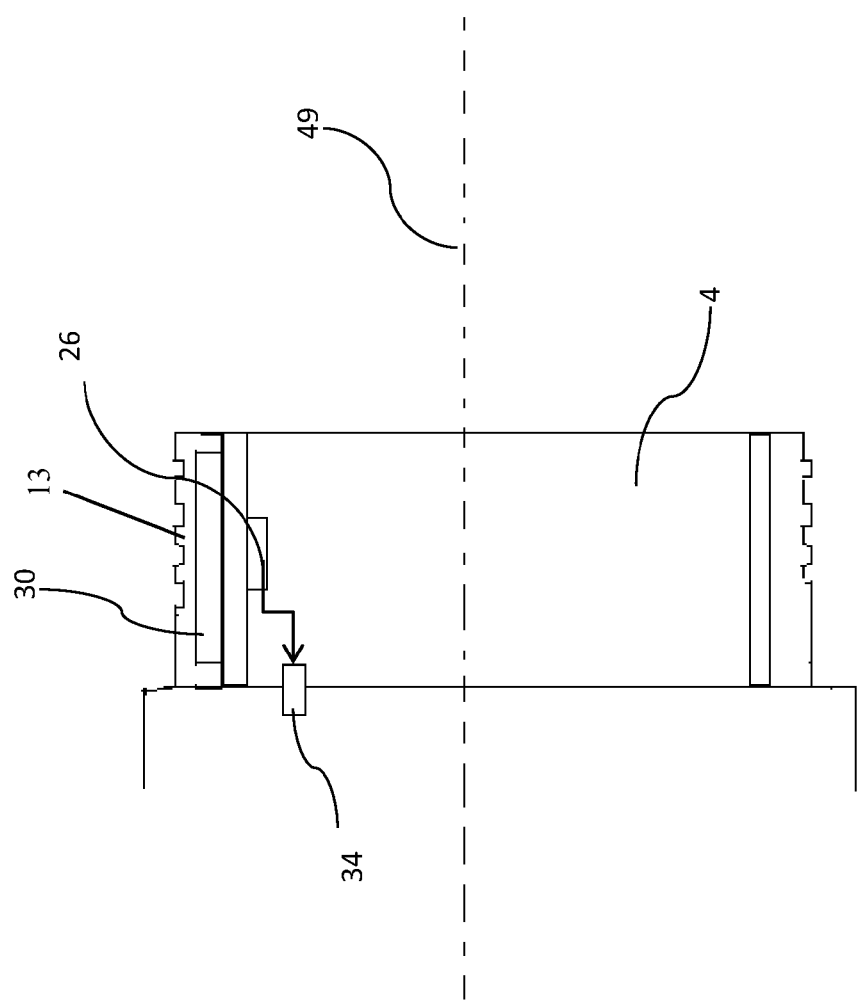

FOCUS RING-CONTROLLED FOCUSING SERVO

CROSS-REFERENCE TO RELATED APPLICATION

The present application claims priority to U.S. provisional patent application No. 61/345,516, entitled "Focus Ring-Controlled Focusing Servo" and filed on May 17, 2010. This priority provisional patent application is incorporated by reference herein in its entirety.

TECHNICAL FIELD

The present invention relates generally to an infrared (IR) image system, and more specifically to an IR camera with a focus ring controlled focusing servo.

BACKGROUND

In present IR image systems (IR cameras) focus on an object is manually controlled by turning a focus ring on an objective with an optical lens system for generating an IR image of an object. A mechanical mechanism translates the movement of the focus ring to a displacement of the lens system in the objective in order to adjust a focal point to centre on a focal plane of an image capturing device in the shape of an infrared sensor array in the camera.

As an alternative or as a complement to manual focus control, IR cameras are often provided with an electromechanical servo system for focus control. Such a focusing servo is usually controlled by a user via an electric switch or by an automatic focus control system. The focusing servo is in present IR cameras used either to actuate an electromechanical displacement mechanism for displacing a lens in relation to a fixed image capturing device or for displacing a movable image capturing device in the direction of the optical axis of a lens.

Servo controlled focusing, however, detaches the user from the direct and intuitive sense for focusing control rendered by manually controlled focusing mechanisms.

PRIOR ART

The patent document WO 2006/060746 to Infrared solutions shows an IR camera with a manual focusing control via a focus ring. It is mentioned that focus of the lens may be changed by moving the lens or by moving the infrared sensor array.

The patent document US2009/0010635A1 to FLIR Systems AB discloses an IR camera with a lens displacement driven by a focusing motor.

The patent document US2009/0303379A1 to Jouji Wada et al shows an IR camera with an electromechanically adjustable image capturing device to effect focusing by means of a servo motor. The servo motor displaces a rotatable circular plate provided with wedges that in their turn displaces the image capturing device linearly along an optical axis.

Similarly, the patent document U.S. Pat. No. 5,969,760 to Polaroid shows an electronic still camera with a mechanically adjustable image capturing device in the form of a CCD to effect focusing via a servo motor. The image capturing device is displaced linearly via a lead screw that is rotated by the servo motor.

OBJECT OF THE INVENTION

The general object of the present invention is to provide an IR camera with an improved servo control device for focus control.

A more particular object of the present invention is to provide an IR camera with a servo control device for focus control that supports a manual mode of operation of a user to actuate focusing.

SUMMARY OF THE INVENTION

The object of the invention is achieved by providing an IR camera with a servo control device for focus control that is actuated by means of a focus ring on the objective of the camera. A displacement of the focus ring actuates the servo to drive a focusing mechanism adapted to enable an image of an object to be focused on an image capturing device in the camera. Controlling the focus operation by means of the focus ring allows a user to operate the camera in a manual mode of operation by turning the focus ring with a hand grip. This gives the user a sense of directly controlling the focus operation by the user's own motion and enables the user to operate the camera in an intuitive manner.

BRIEF DESCRIPTION OF THE DRAWINGS

The invention will be further explained below with reference to the accompanying drawings, in which:

FIG. 3 shows schematically an embodiment of the invention configured for focus ring control by linear displacement of the focus ring.

DESCRIPTION OF THE INVENTION

IR Camera

Figure 1:
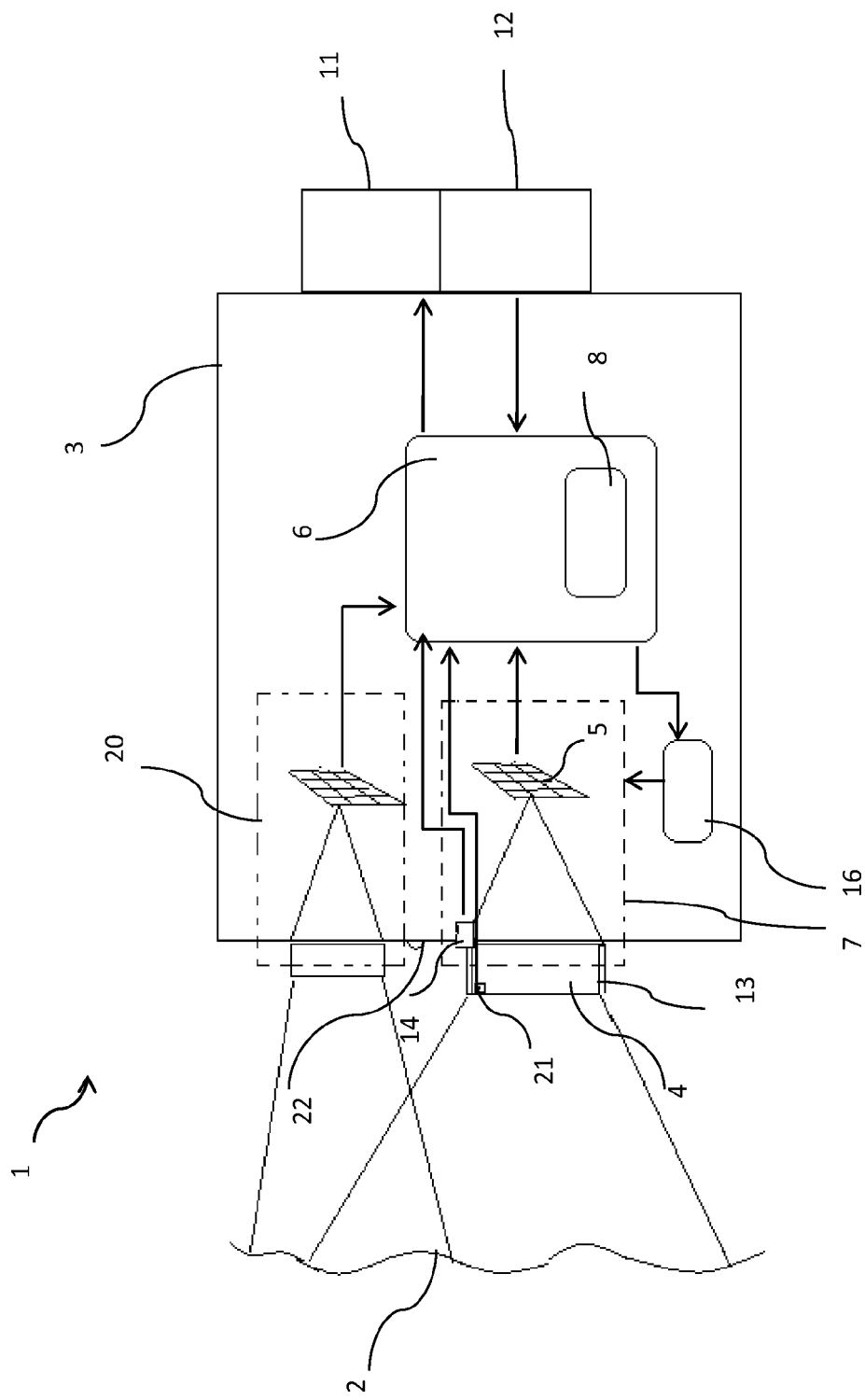
FIG. 1 shows schematically an IR camera devised for focus ring controlled focusing servo according to an embodiment of the invention.

FIG. 1 shows a schematic view of an IR camera 1 in which embodiments of the present invention is realized. The camera 1 comprises a housing 3 having an IR objective 4 with an optical lens system adapted for generating an IR image of an object in an imaged view 2 on a detector for detecting IR radiation in the form of an image capturing device 5 (image capturing array). Radiation in the IR wavelength range that enters the camera via the optical lens system of the objective 4 is focused on the image capturing device 5 by means of a schematically shown focusing mechanism 7. The focusing mechanism 7 is controlled by means of an electromechanical focusing servo system 16.

An output signal from the image capturing device 5 carrying radiometric data is transmitted to a processing unit 6, preferably comprising an FPGA (Field-Programmable Gate Array). The processing unit 6 is usually coupled to or comprises a volatile buffering memory, typically a RAM (Random Access Memory) adapted for temporarily storing data in the course of processing. The processing unit 6 is devised to process infrared image data, i.e. radiometric data captured by the image capturing device 5 as well as to control the focusing servo system 16 dependent on predetermined rules programmed or configured in the processing unit.

A display unit 11 is coupled to an output of the processing unit 6 to receive image data from the processing unit and display an image in a human perceivable manner. An input control unit 12 is coupled to an input of the processing unit 6, and devised to receive and transmit input control data, for example commands or parameter data to the processing unit 6.

Optionally, as shown in the embodiment in FIG. 1 the IR camera may comprise a visual image camera 20 with an objective having a lens system adapted for focusing radiation in the visible wavelength range and an image capturing device devised for capturing a visual image. The objective of the visual image camera is typically arranged to focus on the same imaged view as the IR objective. An output of the visual camera 20 is coupled to an input of the processing unit 6. Likewise optionally the IR camera may comprise a laser pointer 22 devised to aim at the imaged view for the purpose of pointing at and assisting in identifying objects in an infrared image. The visual image and the laser pointer may be used to determine a focus distance to an object in the imaged view.

Objective and Focus Ring

The IR objective 4 shown in FIG. 1 further comprises a displaceable focus ring 13 and a focus ring displacement detector system 14. An output of the focus ring displacement detector system is coupled to an input of the processing unit 6. The processing unit 6 is programmed to control the focusing servo to actuate the focusing mechanism dependent on a displacement of the focus ring. The focus ring displacement detector system is in different embodiments of the invention realized in different ways, for example by means of an optical, magnetic, inductive or mechanical displacement sensor detecting e.g. cogs or patterns that are devised to move with a displacement of the focus ring and generating an output signal dependent on the displacement. Further, in different embodiments, the focus ring detector system is configured to detect an angular displacement or a linear displacement of the focus ring.

In a variant of a realization concept for the invention, the focus ring displacement detector system comprises a multi-pole magnetic element coupled to the focus ring such that a displacement of the focus ring causes a dependent displacement of the multi-pole magnetic element. A Hall sensor, also comprised in this focus ring displacement detector system, is fixedly mounted in relation to the multi-pole magnetic element. The Hall sensor is mounted in the vicinity of the magnetic element and devised to generate an output sensor signal in response to a displacement of the poles of the magnetic element past the Hall sensor, and thereby in response to and dependent on a displacement of the focus ring. The output signal from the Hall sensor is transmitted to the processing unit as explained above.

Preferably, the objective also comprises a temperature sensor 21 having an output signal line coupled to the processing unit. The signal from the temperature sensor is used in the processing unit 6 to determine compensation factors dependent on varying ambient temperature.

Angular Displacement of Focus Ring

Figure 2:
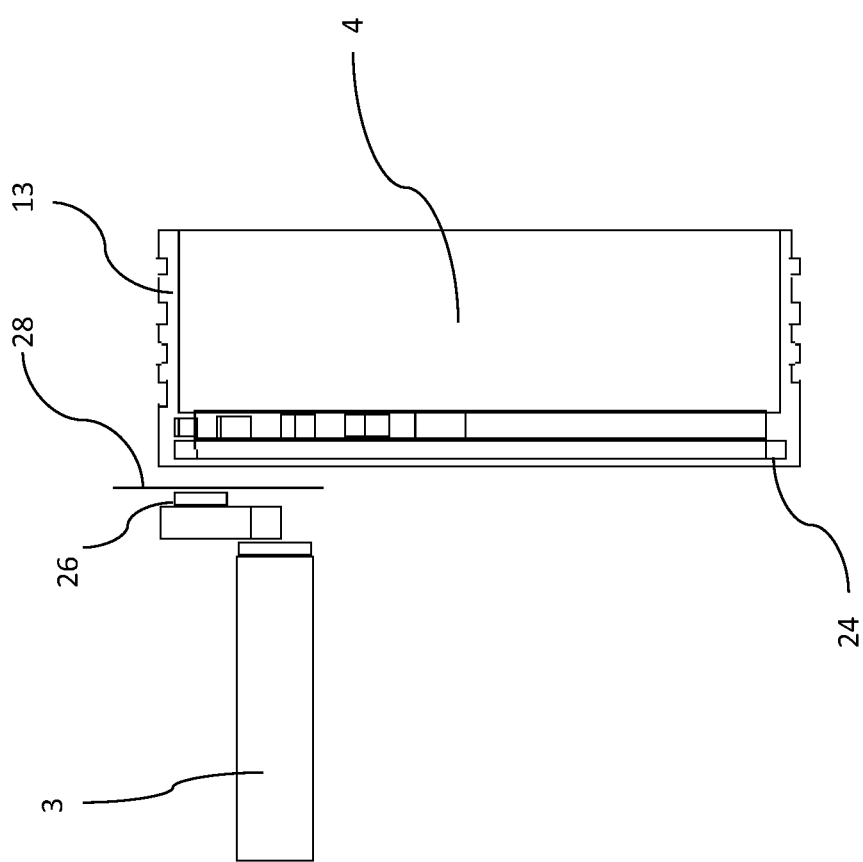
FIG. 2 shows schematically an embodiment of the invention configured for focus ring control by angular displacement of the focus ring.

FIG. 2 shows schematically an embodiment of an IR camera configured for focus ring controlled focusing dependent on an angular displacement of the focus ring. As shown in FIG. 2 an objective 4 with a focus ring 13 is provided with a multi-pole magnetic element in the form of a circular magnet ring 24, and a Hall sensor 26, here in the shape of an integrated circuit comprising a plurality of Hall elements is mounted to the housing 3. The circular magnet ring 24 is directly mounted to the focus ring 13 and the Hall sensor 26 is mounted in the vicinity of and the facing the magnet ring. The Hall sensor is mounted on a member of the camera housing 3 such that it is fixed in relation to the displaceable focus ring and the thereto coupled magnet ring.

A thin plate 28 may be mounted between the magnetic strip of the objective and the Hall sensor for the purpose of achieving a suitable predetermined dampening of the magnetic fields that affect the Hall sensor. The thickness of the plate 28 is for example 0.25-0.5 mm and a suitable gap including the plate is designed between the Hall sensor and the magnetic element. IR objectives on present day IR cameras are often mounted to the camera house by means of a bayonet coupling, and in such configurations the plate 28 also serves the purpose to protect the Hall sensor when an objective is decoupled from the camera house.

Linear Displacement of Focus Ring

FIG. 3 shows schematically an embodiment of an IR camera configured for focus ring controlled focusing dependent on a linear displacement of the focus ring. An objective 4 with a focus ring 13 is provided with a multi-pole magnetic element in the form of an elongate magnet strip 30. The magnet strip 30 is oriented substantially along the optical axis 49 of the objective. A Hall sensor 26 similar to that described above is mounted on the objective body underneath the focus ring, possibly covered by a protective shielding plate. Positioning and of the magnet strip in relation to the Hall element is designed with similar considerations as for the angular displacement embodiment. An output signal line from the Hall sensor is coupled to the processing unit (not shown), possibly via a connector pair 34 configured in a bayonet coupling variant of objective and camera. It is also conceivable to have a configuration with the magnet strip mounted to the fixed part of the objective and the Hall sensor mounted to the displaceable focus ring with a suitable solution for signal transmission to the processing unit.

Displacement Detector System having a Magnetic Element and Hall Sensor

Figure 4A:
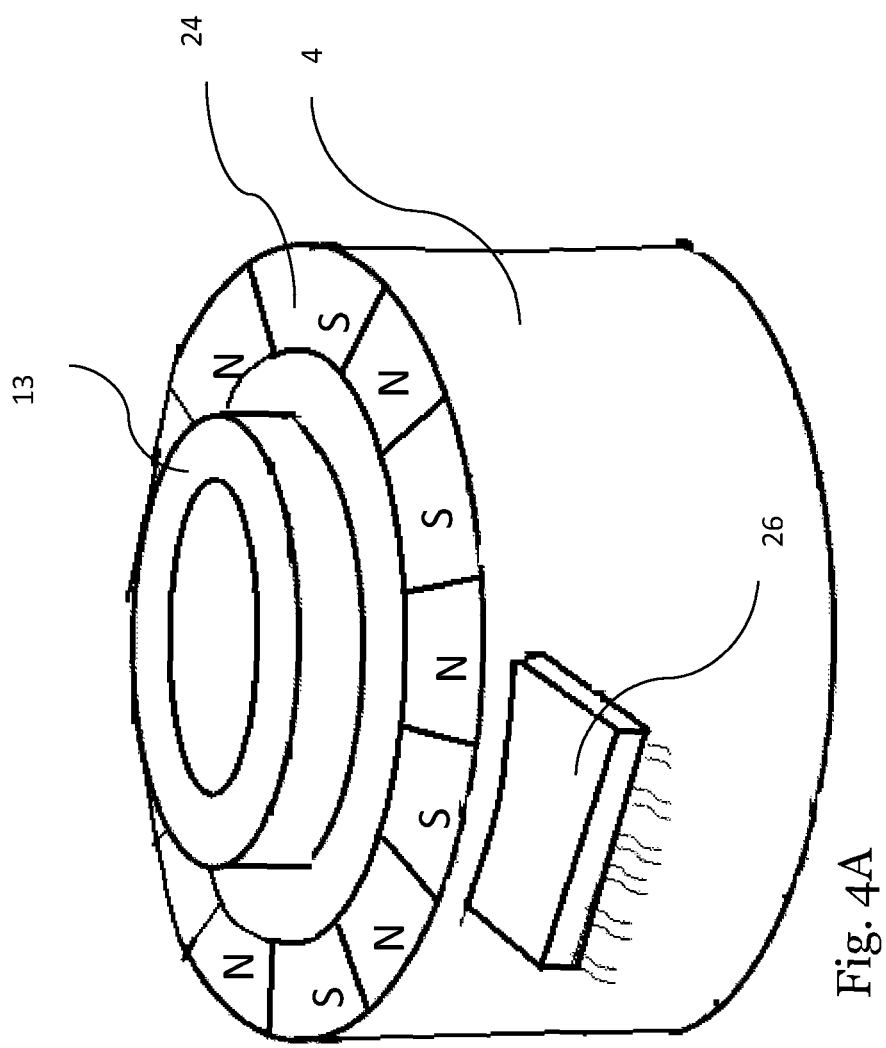
FIGS. 4A and 4B show schematically examples of components comprised in embodiments of a focus ring displacement detector system according to the invention.
Figure 4B:
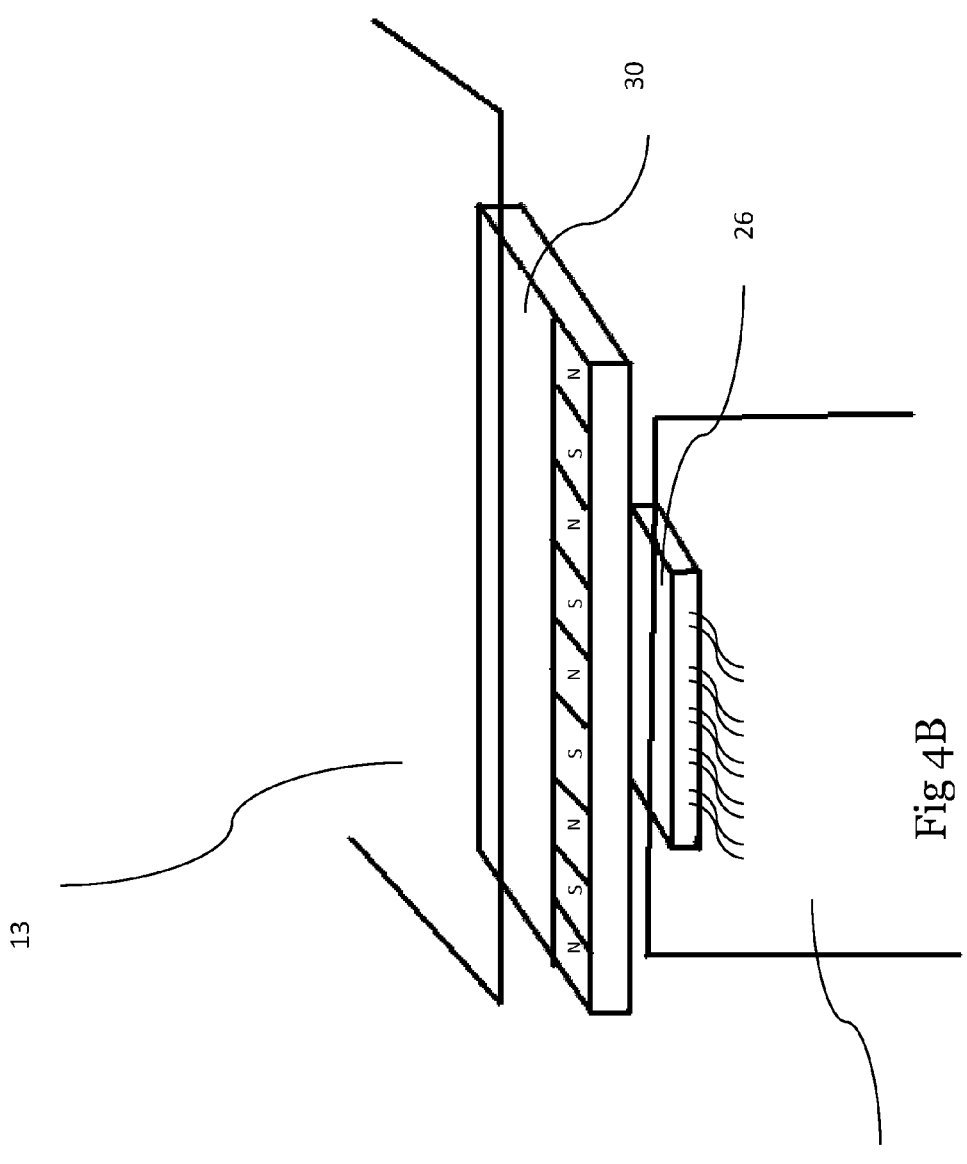

FIGS. 4A and 4B show schematically examples of components comprised in embodiments of a focus ring displacement detector system according to the invention.

In FIG. 4A a multi-pole magnet ring 24 is mounted to a focus ring 13 of an objective. The magnet ring 24 comprises a plurality of north (N) and south (S) magnet pole pairs arranged in a series along the magnet ring. FIG. 4B illustrates similar components in the shape of a magnet strip mounted to a focus ring 13 of an objective 4 and a Hall sensor mounted to the fixed part of the objective. Similarly the pole pairs are arranged in a series along the magnet strip. A Hall sensor 26, preferably in a single chip integrated circuit (IC) comprising integrated Hall elements such as the product Integrated IC AS5304 or AS5306 from Austria Microsystems (www.austriamicrosystems.com), is provided to detect the pole pairs passing the Hall sensor as the focus ring is angularly (FIG. 4A) or linearly (FIG. 4B) displaced.

In a specific exemplifying embodiment of the invention for a specific size of IR objective, the focus ring comprises a magnet ring with 50 pole pairs in a series. The Hall sensor in this example generates a pulsed output signal with 127 pulses for every pole pair displacement past the Hall sensor. A full revolution of the focus ring would give 6350 pulses. Preferably, the available displacement stroke of the focus ring for controlling focusing is configured to about a quarter of a revolution, with the corresponding amount of pulses available for the processing unit to use for the control of the focusing servo mechanism.

Focusing Servo System having Linearly Displaceable Image Capturing Device

Figure 5:
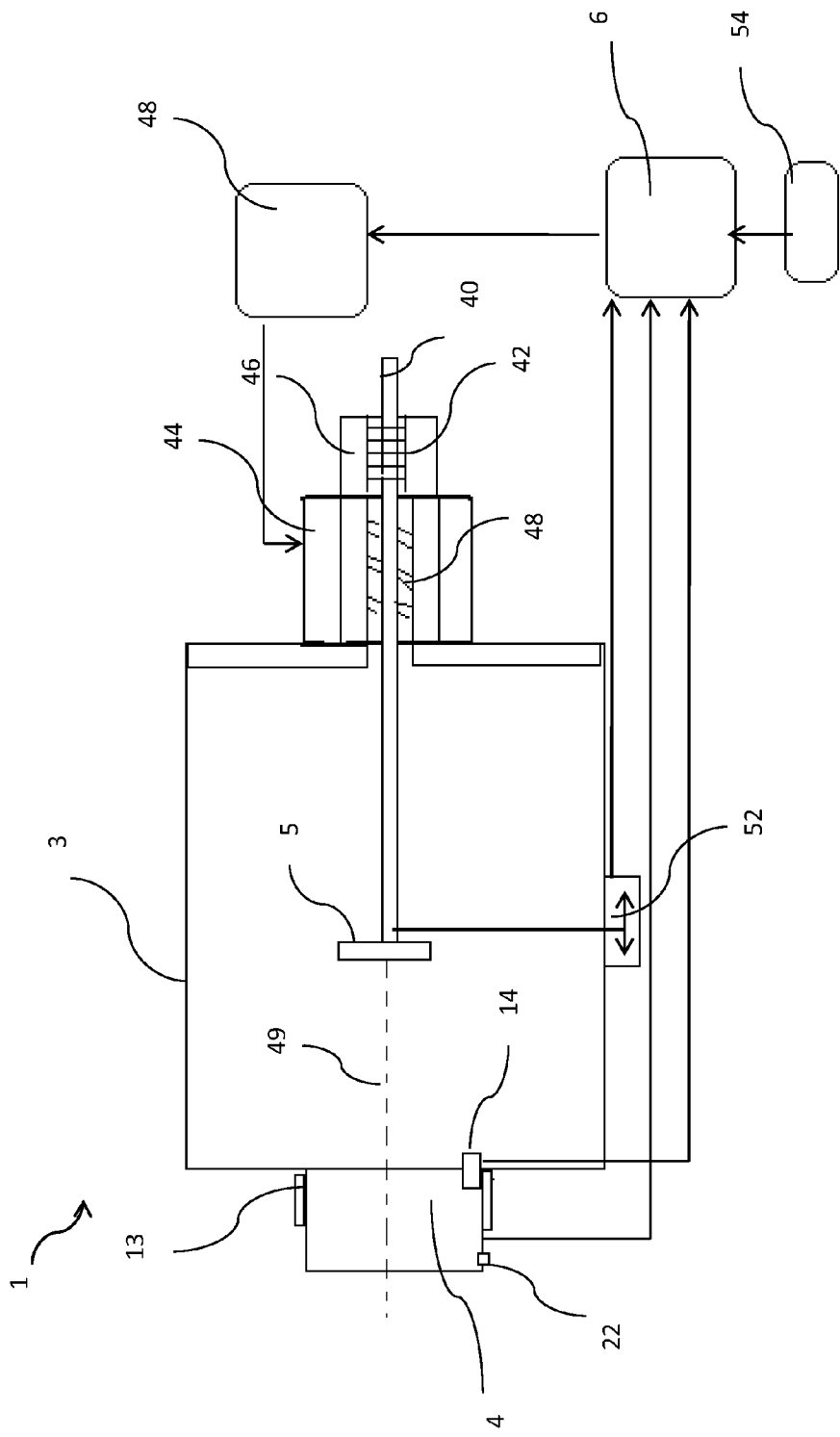
FIG. 5 shows schematically an embodiment of a focusing servo system and a focusing mechanism having a linearly displaceable image capturing device in an IR camera.

FIG. 5 shows schematically in more detail an embodiment of a focusing servo system and a focusing mechanism in an IR camera 1 according to above described embodiments. As described above, a displaceable focus ring coupled to a focus ring displacement detector system 14 and a temperature sensor 22 is coupled to a processing unit 6 that is configured to control a focusing servo system 9.

The focusing servo system 9 in this embodiment actuates a focusing mechanism based on the displacement of an image capturing device. An image capturing device 5 is mounted on a lead screw rod 40 having lead threads 42 at its free end. The lead screw rod passes 40 through the rotor of a step motor 44 having a nut 46 that is coupled to the rotor and having nut threads mating with the lead threads 42. The step motor 44 rotates the nut 46, which via the lead threads 42 displaces the image capturing device 5 mounted at the other end of the lead screw rod 40 linearly along an optical axis 49 of the objective. A coil spring 48 is configured to bias the lead screw rod 40 in order to enhance the exactness in the displacement of the image capturing device. The image capturing device 5 is mechanically coupled to a focusing mechanism feedback sensor 52, for example in the shape of a potentiometer coupled to an A/D converter in a per se known manner, generating a feedback signal to the processing unit 6. The step motor 44 is actuated by the processing unit 6 via a driving stage or exciter 48 dependent on input signals from the focus ring displacement detector system 14, the temperature sensor 22, the focusing mechanism feedback sensor 52 and possibly lens parameters 54 stored in a parameter memory according to a predetermined scheme programmed or configured in the processing unit.

The stroke of the displacement of the image capturing device is configured dependent on the focal length of the objective, and is for typical focal lengths in the range of 3-12 millimeters. An embodiment is configured to drive the step motor 44 such that the image capturing device is displaced a distance in the range of 5 micrometers per step.

Focusing Servo System having Linearly Displaceable Lens

Figure 6:
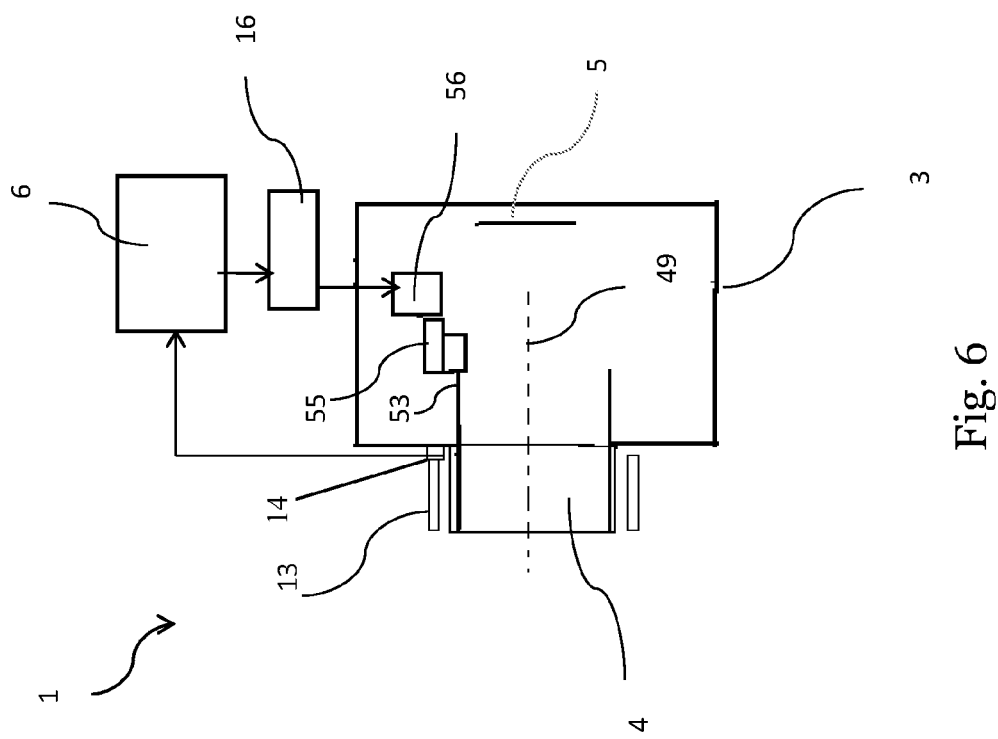
FIG. 6 shows schematically an embodiment of a focusing servo and a focusing mechanism having a linearly displaceable lens.

FIG. 6 shows schematically and in a simplified manner another embodiment of a focusing servo system and a focusing mechanism in an IR camera 1 with focusing mechanism in the form of a linearly displaceable lens. An image capturing device 5 is fixedly mounted in the camera housing 3, a objective 4 provided with a displaceable focus ring 13 coupled to a focus ring displacement detector system 14 is coupled to a processing unit 6 that is configured to control a focusing servo system 9. A lens 51 mounted on a lens support structure 53 is mounted in the objective such that it is linearly displaceable along an optical axis 49. The displacement is for example as in FIG. 6 actuated by means of a step motor 56 via a toothed gearing 55 between the lens support structure 53 and the step motor 56. Similarly to the previously described embodiment, the step motor is actuated by the focusing servo system 9 under control of the processing unit 6 dependent on a displacement of the focus ring 13 as detected by the focus ring displacement detector system 14.

Focus Ring Displacement Stroke and Far Focus

Figure 7:
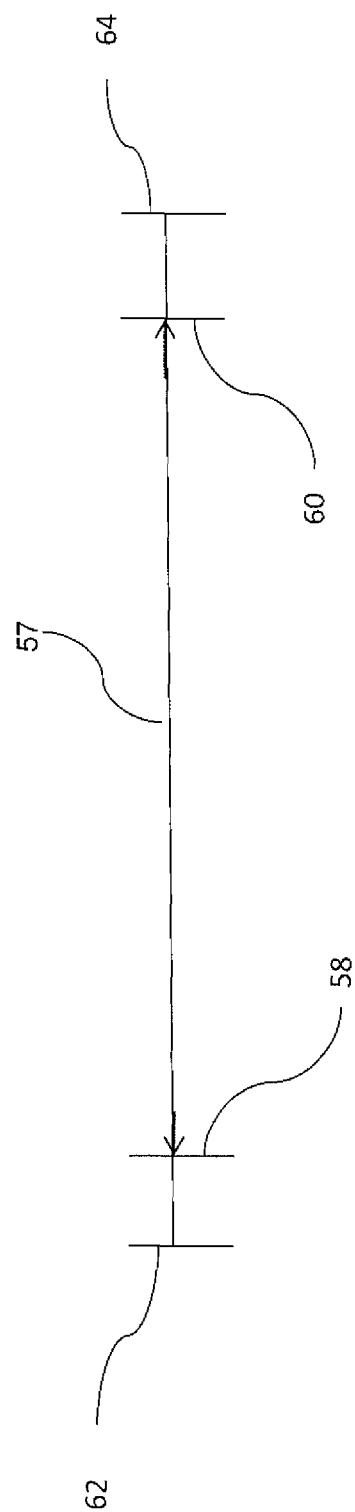
FIG. 7 illustrates schematically a close focus position and a far focus position for the stroke of the focus ring.

Preferably, as schematically illustrated in FIG. 7, the control of the focusing mechanism is configured in relation to an available displacement stroke 57 for focus control with the focus ring such that a close focus position 58 and a far focus position 60, respectively, of the focus ring are reached before the respective close end positions 62 and far end position 64 of the focusing mechanism. This enables the user to displace the focus ring past the close focus 58 and far focus 60 positions, respectively, which gives the user the possibility to under-focus or over-focus the captured image and reinforces the impression of direct manual focus control.

Focus Ring Displacement Resistance

Figure 8:
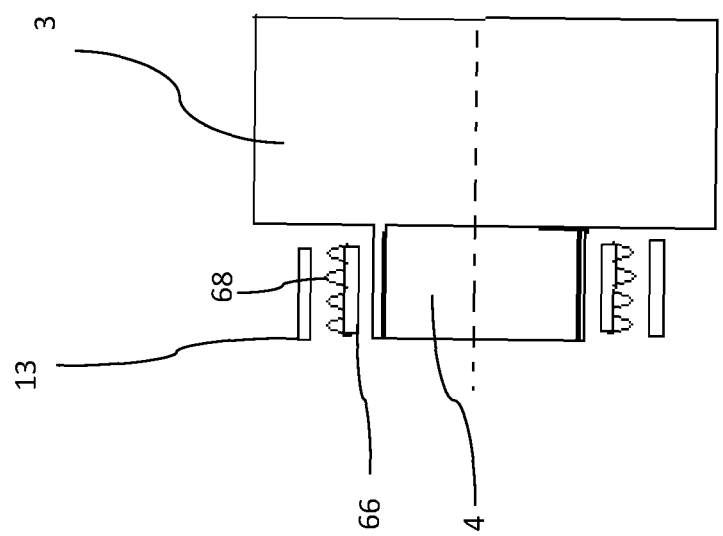
FIG. 8 illustrates schematically an objective with a resistance element under the focus ring in an embodiment of the IR camera according to the invention.

In order to achieve a resistance against focus ring displacement that is comfortable to a user a resistance element is preferably provided underneath the focus ring in a space between the focus ring and the fixed part of the objective. FIG. 8 shows an embodiment of a resistance element 66 mounted on the fixed part of an objective 4 underneath a displaceable focus ring 13. The resistance element 66 is configured as a ring provided with spacer cushions 68, preferably made in silicone or some other material with selected dimensions and properties with regard to friction and/or elasticity. The focus ring 13 rides upon the spacer cushions 68 which render a convenient resistance against the focus displacement actuated by the hand of a user.

Application in Visual Image Camera

The above described inventive concept may also be applied in a visual image camera. The inventive features are then applied in the corresponding components of such a visual image camera.

The invention claimed is:

1. An infrared (IR) camera comprising:
   a camera housing having an image capturing device;
   an objective with an optical lens system for generating an IR image of an object;
   a focusing mechanism for focusing the optical lens system;
   a focus ring that is displaceably mounted on the objective and adapted to control an electromechanical focusing servo system actuating the focusing mechanism dependent on a displacement of the focus ring;
   a focus ring displacement detector system coupled to the focus ring and having a series of magnet north and south pole pairs; and
   a Hall sensor fixedly mounted relative to the focus ring displacement detector system and adapted to generate a signal for every magnetic pole pair that passes the Hall sensor when the focus ring displacement detector system is displaced with the focus ring.

2. The infrared camera of claim 1, wherein the focusing mechanism is actuated dependent on an angular displacement of the focus ring.

3. The infrared camera of claim 2, wherein the focus ring displacement detector system includes a multi-pole magnetic ring comprising the series of magnet north and south pole pairs.

4. The infrared camera of claim 1, wherein the focusing mechanism is actuated dependent on an linear displacement of the focus ring.

5. The infrared camera of claim 4, wherein the focus ring displacement detector system includes a magnetic strip comprising the series of magnet north and south pole pairs.

6. The infrared camera of claim 1, further being configured such that the focus ring has a predetermined available stroke for focus control with a close end position, a close focus position, a far focus position and a far end position.

7. The infrared camera of claim 1, wherein the focus ring is displaceably mounted relative to a fixed part of the objective with a predetermined resistance against displacement.

8. The infrared camera of claim 7, further comprising an intermediate layer of friction material between the focus ring and the fixed part of the objective.

9. The infrared camera of claim 8, wherein the friction material comprises silicon cushions arranged such that an inner envelope surface of the focus ring rides on top of the silicon cushions.

10. The infrared camera of claim 1, wherein the focusing mechanism is arranged to linearly displace the image capturing device dependent on a displacement of the focus ring.

11. The infrared camera of claim 10, further comprising a lead screw rod mounted to the image capturing device, the elongate axis of the lead screw rod coinciding with the optical axis of the objective, wherein the lead screw rod is mechanically coupled to the rotor of a step motor such that the lead screw rod is axially displaceable by actuating the step motor, and wherein the camera is configured to control the step motor dependent on a displacement of the focus ring.

12. The infrared camera of claim 1, wherein the focusing mechanism is arranged to linearly displace a lens in the objective dependent on a displacement of the focus ring.

13. The infrared camera of claim 1, further comprising a processing unit configured to control the electromechanical servo system dependent on a displacement of the focus ring.

* * * * *